May 22, 1956
H. M. OLSON
2,746,819
PISTON GUIDE AND PISTON RING WEAR SHIELD
Filed Dec. 28, 1953
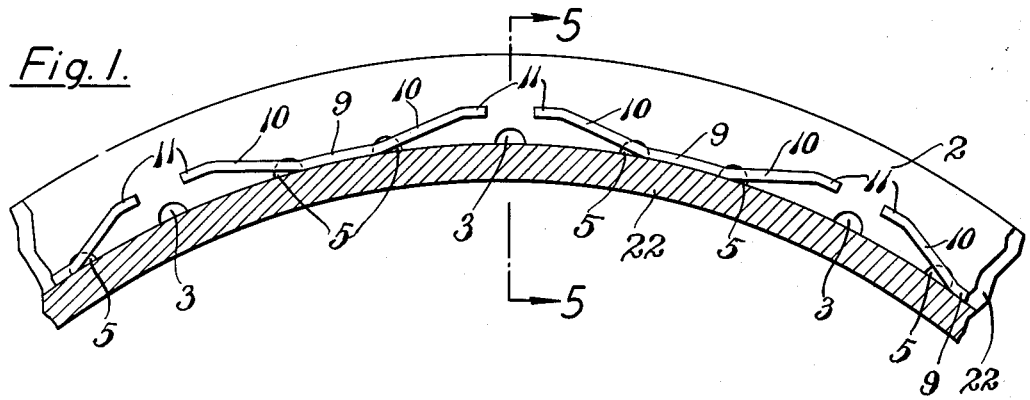
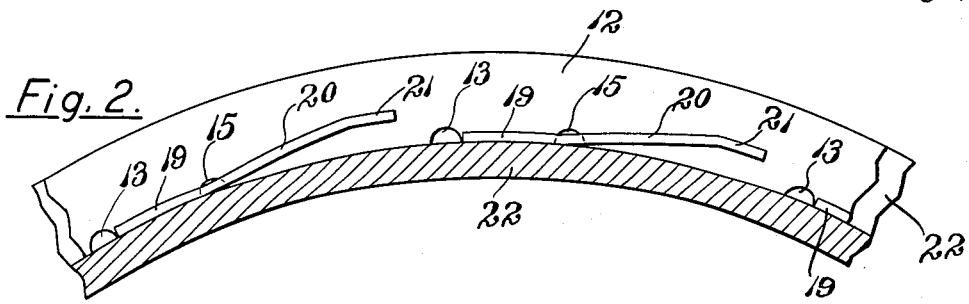
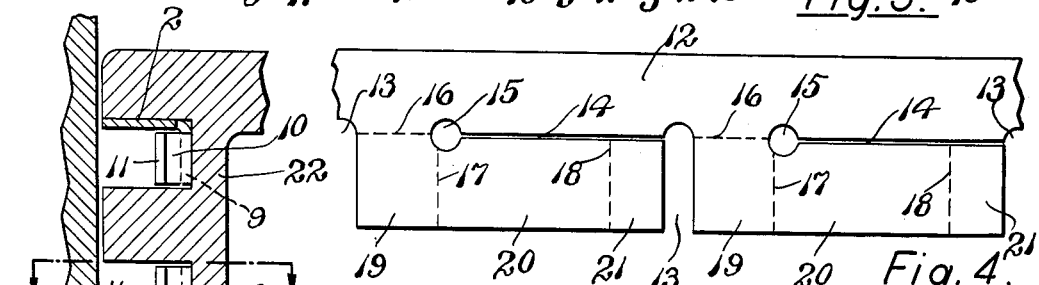
INVENTOR.
Holly M. Olson
BY
Frank E. Liverance Jr.
Attorney

United States Patent Office 2,746,819
Patented May 22, 1956

2,746,819

PISTON GUIDE AND PISTON RING WEAR SHIELD

Holly M. Olson, Muskegon, Mich., assignor to Sealed Power Corporation, Muskegon, Mich., a corporation of Michigan Application December 28, 1953, Serial No. 400,524

4 Claims. (Cl. 309—44)

This invention relates to a simple, novel and useful means for guiding pistons in internal combustion engines during operating cycles thereof, and also provides a wear shield for a piston ring associated therewith. By such novel structure improved performance and longer life of operation of pistons and piston rings are attained, together with a simplification of manufacturing and assembly, reducing costs of internal combustion engines.

The great number of variable forces acting upon pistons in motor vehicle engines is well known, being greater and more severe than any other part of the engine. The variations in temperature, the expansion of the parts due thereto, in heat dissipation from the exploded or burned fuel mixtures, different angular positions of the connecting rods between the pistons and the driving crankshaft of the engine, the extremely high pressures and the increasing high speeds to which the engines are subjected, are common to all automotive engines and are greatly enhanced in effects in the so-called V-engines, which are more and more coming into use, particularly in so-called pleasure automobiles, though also used in trucks and the like in increasing numbers. Such V-type engines have also brought about shorter lengths in the pistons used, together with shorter lengths in the connecting rods between the pistons and the crankshafts of engines, causing greater whip and tilting action of the piston as it passes through its cycles of reciprocation under widely varying load conditions. The whipping or tilting piston movements tend to break the seal of the ring against cylinder walls with undesirable results of excess ring groove wear, particularly on aluminum alloy pistons, and permit unwanted upward movement of lubricating oil in the cylinders with resultant excess use of lubricating oil.

With my invention there is provided, in a one-piece structure, a piston guide which will hold the piston more truly in straight alignment with the vertical axis of the cylinder, and prevent whipping or tilting action. Also, a wear shield between a piston ring and a side of the ring groove of the piston in which it is located is provided which, being of a metal harder than the metal used in the piston, protects the piston from wear at the ring groove. Such one-piece piston guide and piston wear shield is installed in a piston ring groove and any of the types of piston rings normally suitable for the various ring grooves of the piston may be used therewith. The one-piece piston guide and wear shield which I have provided is between the piston ring and the piston, the piston ring bears thereagainst and is forced outwardly by yielding spring pressure and the wear shield of the invention is between the piston ring and a side of the piston ring groove, the effect being to hold the piston ring at its outer face or edges in proper square contact with the cylinder wall and also hold the piston from tilting or whipping movement.

It is the object and purpose of my invention to provide a simple, effective, economically manufactured and easily installed device of the type described, obtaining the many desirable objects and results which have been enumerated.

An understanding of the invention may be had from the following description taken in connection with the accompanying drawing, in which, Fig. 1 is a fragmentary enlarged plan and horizontal section, substantially on the plane of line 1—1 of Fig 5, showing the piston guide and piston ring wear shield of my invention in a piston ring groove.

Fig. 2 is a similar view showing a modified or different form of the guide and wear shield in a piston ring groove.

Fig. 3 is a plan view of a fragmentary length of thin ribbon stock spring material from which the guide and the shield of my invention is made, in the first steps of the process of making thereof, the form being that shown in Fig. 1.

Fig. 4 is a like view of the other form shown in Fig. 2, and

Fig. 5 is a fragmentary vertical section, on line 5—5 of Fig. 1, through a piston assembled with a cylinder with the piston guides and ring wear shields, one in each of the ring grooves of the piston.

Like reference characters refer to like parts in the different figures of the drawing.

The material used in the manufacture of the piston guide and piston wear shield is, preferably, ribbon spring steel of suitable width and thickness, generally in the neighborhood of .020" to .025" in thickness which is passed through progressive dies and blanked and sheared as indicated in Fig. 3. The ribbon stock 1 in such blanking and shearing is left at one edge with a continuous band 2 which in width is slightly less than one-half of the total width of the ribbon member 1. From the opposite edges spaced transverse slots 3 are cut out leaving between successive slots a length of metal which is sheared at slits 4 from the inner end of each of the slots 3 toward openings 5 preferably of circular form as shown. The two openings 5 associated with any two slits 4 are spaced from each other and the metal thus partially blanked and sheared from the continuous band 2 may be bent to lie at right angles along the bending line indicated at 6 between said openings 5. Such bending line 6 is in alignment with the slits 4 as shown.

The metal between any two of the slots 3 is also itself bent along transverse bending lines 7 and 8. Such lines 7 are at right angles to the band or flange 2 and to the line 6, and extend from the openings 5 outwardly to the free edge of the metal section between each of the two successive slots 3. The bending lines 8 parallel the lines 7 and are spaced a short distance inwardly from each end of the described sections of metal between successive slots 3. There is thus defined generally square sections 9 and 10 integral with each other with terminal lips 11 integral with the sections 10.

Upon bending the metal along the lines indicated at 6 the continuous band 2 becomes the wear shield for a piston ring groove. The sections 9 at right angles thereto will come against the bottom of such piston ring groove. The sections 10 bent outwardly about the lines 7, diverge outwardly away from each other at an acute angle to the plane of the section 9 to which connected, and the terminal lips 11 are bent to provide sections against which the inner edges of a piston ring are pressed when installed in a piston ring groove in which such wear shield is located. It is evident that when a piston ring as at 24 (Fig. 5) is placed against said terminal lips 11, its curved inner sides or edges are outwardly a distance from the sections 9 which are against the bottom of the piston ring groove, and that when the piston ring is closed at its parting, being contracted to enter an engine cylinder, the sections 10 are stressed inwardly toward the bottom of the piston ring groove. The sections 10 being spring material, forces are generated therein which react against the piston ring and force it with additional pressure, over and above that inherent in the piston ring itself, against a cylinder wall in an engine in which installed.

In Fig. 4 instead of having two spring sections 10 with terminal lips 11 from each of the sections 9, the ribbon material is blanked and slit to provide a continuous flange band 12, similar to the band 2, with spaced transverse slots 13 from the opposite edge of the material to said band, and slits 14 one from one side of each of the slots 13 to an opening 15 with a bending line 16, similar to the line at 6, between the opening 15 and next adjacent slot. Also bending lines 17 and 18 as shown in Fig. 4 with the lines 16 and slits 14 define sections 19, 20 and 21 corresponding to the sections 9, 10 and 11 of the first described form. The sections 19 like sections 9 come against the bottom of a piston ring groove, the section 20 extends diagonally outward from one edge of the section 19, and the sections 21 are terminal lips corresponding to the lips 11, against which the inner edges of a piston ring bear.

It is apparent that in circular form and parted at one side, as in general all piston ring expanders and the like located in piston ring grooves are parted, and with the bands or flanges 2 or 12 parallel to and against a side of a piston ring groove, the sections 9 or 19 are against the bottom of the ring groove in piston 22, as in Fig. 5. The outwardly extending spring members, the sections 10 and lips 11 in the first form and sections 20 and terminal lips 21 in the other form are away from the bottoms of the piston ring grooves. A piston ring of the proper selected type as at 24 (Fig. 5) inserted in each of the grooves of the piston is brought against the lips 11 or 21 at its inner edges, and at a side is against the band or flange 2 or 12.

With a piston made of an aluminum alloy, softer than cast iron, it is apparent that the side of the ring groove against which the band or flange 2 engages is protected against battering and widening of the groove. The terminal lips 12 or 21 of the spring members, in large numbers around a ring, provide a very considerable contact area against a piston ring and being pressed with force against said ring and resisting inward movement of the ring serve to hold the ring squarely at its outer face against the cylinder wall. The piston ring at a side bearing against the band or flange 2 or 12, and held squarely against the wall of the cylinder and against tilting, will hold the piston truly and properly aligned with its axis coincident with the longitudinal axis of the cylinder.

The piston is therefore properly aligned and guided in the cylinder and at its grooves are shielded against wear and battering, especially at the sides of the grooves where such wear or battering is most liable to take place. There is an additional outward force over and added to the inherent force within the ring which it has when closed at its parting and installed in an engine cylinder.

In the lower or oil groove of a piston, lubricating oil passing through the ring can pass through the spaces between the adjacent edges of the lips 11. Additional venting if required or wanted may be accomplished by cutting from such lips 11 and adjacent sections 10, additional metal as indicated by the dashed lines 23 in Fig. 3. One of such indications of severing the metal is shown, it being understood that sections of the metal within lines of cutting as indicated at 23 may be cut from any or all of the outwardly extending spring members which consist of members 10 and 11, and 20 and 21 in the two forms described. And such additional sections of metal which are thus cut may be of any suitable area.

The combined piston guide and piston ring wear shield unit made as described is of a novel and desirable structure. The short spring members provided by sections 10 and 11 in one form, and of 20 and 21 in the second form, provide short springs in great numbers with a consequent more uniform greater pressure against the piston ring 24. The outward pressure force which may be desired is controlled through selecting the dimensions of the material which is used and is also controllable through the number, length and the extent of outward projection of the spring members. The unit may be made to fit freely in a groove if wanted, or snugly if preferred. Such units rest on the bottoms of ring grooves and the outer edges of the ring groove wear flange 2 or 12 may be either flush with the outer surface of the piston upon which installed or be inwardly thereof. The piston ring 24 extends beyond the outer edges of the band 2 to press against the cylinder wall.

The invention is defined in the appended claims and is to be considered comprehensive of all forms of structure coming within their scope.

I claim:

1. A device of the character described, comprising a continuous generally circular flange of thin metal adapted to bear against a side of a piston ring groove, having a plurality of spaced rectangular sections of metal integrally connected to said flange and located generally at right angles thereto and adapted to bear against the bottom of said piston ring groove, an integral yieldable section of metal connected at a transverse edge of each rectangular section, each extending outwardly therefrom toward but short of the outer edges of said flange, and a piston ring pressingly engaging all of said yieldable sections with one side of said piston ring located against the inner side of said flange.

2. A piston ring comprising, a continuous generally circular flange of thin spring metal, parted at one side, adapted to be placed in a piston ring groove against a side of said groove, having a plurality of spaced generally rectangular sections of metal integrally connected to and at the inner edges of said flange, located generally at right angles thereto and adapted to bear at inner sides against the bottom of said piston ring groove, a yieldable section of metal integrally connected at one end to each of said rectangular sections, extending therefrom outwardly at an angle to the rectangular section to which attached, each having a free end lip portion located inwardly from the outer edge of said flange and generally parallel to the adjacent edge thereof, and a piston ring pressingly engaging said free end portions and forcing them resistingly inward, one side of said piston ring being located against the inner side of said flange, and at its outer curved side extending beyond the outer edges of the flange.

3. A piston having a piston ring receiving groove and piston ring wear shield comprising, a generally circular, parted flange of thin metal, located in said piston ring groove against a side thereof, a plurality of spaced metal sections connected to said flange at the inner edges thereof and located generally at right angles thereto engaging against the bottom of said piston ring groove, and yielding spring members connected with said sections extending angularly outwardly therefrom and terminating inwardly of the outer edges of said flange, against the outer portions of which a piston ring is adapted to pressingly engage.

4. A piston, a piston ring receiving groove and a piston ring wear shield comprising, a generally circular, parted flange of thin metal, located in said piston ring groove against a side thereof, spaced means connected to said flange at its inner edge, located generally at right angles thereto extending toward and substantially to the opposite side of said piston ring groove, yielding spring means connected to each of said spaced means extending therefrom outwardly toward but short of the outer edges of said flange, and a piston ring pressingly engaging said spring means, said piston ring at one side thereof lying against the inner side of said flange and at its opposite side against the other side of said piston ring groove.

References Cited in the file of this patent

UNITED STATES PATENTS

| | | |
|---|---|---|
| 1,917,926 | Decker | July 11, 1933 |
| 2,234,159 | Marien | Mar. 4, 1941 |
| 2,274,805 | Phillips | Mar. 3, 1942 |
| 2,310,311 | Phillips | Feb. 9, 1943 |
| 2,380,767 | Koether | July 31, 1945 |
| 2,583,957 | Marvin | Jan. 29, 1952 |

FOREIGN PATENTS

| | | |
|---|---|---|
| 50,308 | France | Mar. 16, 1940 |

(Addition to Pat. 852,196.)